(12) United States Patent
Benson et al.

(10) Patent No.: US 11,240,211 B2
(45) Date of Patent: Feb. 1, 2022

(54) SYSTEM AND METHOD TO LEVERAGE EDR, ECU, CAN AND OBD DATA FROM VEHICLES BY MEANS OF BLOCKCHAIN TECHNOLOGY

(71) Applicants: Richard Benson, Pompano Beach, FL (US); Clayton Leo Henry, Deale, MD (US)

(72) Inventors: Richard Benson, Pompano Beach, FL (US); Clayton Leo Henry, Deale, MD (US)

( * ) Notice: Subject to any disclaimer, the term of this patent is extended or adjusted under 35 U.S.C. 154(b) by 0 days.

(21) Appl. No.: 16/569,325

(22) Filed: Sep. 12, 2019

(65) Prior Publication Data

US 2021/0084015 A1 Mar. 18, 2021

(51) Int. Cl.
*H04L 29/06* (2006.01)
*G07C 5/00* (2006.01)
*H04L 9/06* (2006.01)
*H04W 12/03* (2021.01)

(52) U.S. Cl.
CPC .......... *H04L 63/0428* (2013.01); *G07C 5/008* (2013.01); *H04L 9/0643* (2013.01); *H04W 12/03* (2021.01); *H04L 2209/38* (2013.01); *H04L 2209/80* (2013.01); *H04L 2209/84* (2013.01)

(58) Field of Classification Search
None
See application file for complete search history.

(56) References Cited

U.S. PATENT DOCUMENTS

| | | | |
|---|---|---|---|
| 10,719,501 B1* | 7/2020 | Leise | G06F 16/219 |
| 2015/0086016 A1* | 3/2015 | Oshida | H04L 9/0822 |
| | | | 380/255 |
| 2017/0200324 A1* | 7/2017 | Chennakeshu | H04L 12/40104 |
| 2018/0091596 A1* | 3/2018 | Alvarez | H04L 67/12 |
| 2018/0158034 A1* | 6/2018 | Hunt | G06Q 20/027 |
| 2019/0166459 A1* | 5/2019 | Wootton | H04L 5/006 |
| 2019/0281052 A1* | 9/2019 | Lekkas | H04W 4/46 |
| 2020/0013241 A1* | 1/2020 | Johnson | B60R 25/248 |
| 2020/0126324 A1* | 4/2020 | Hutchins | G07C 5/0808 |
| 2020/0143372 A1* | 5/2020 | Liu | H04L 9/0643 |
| 2020/0225643 A1* | 7/2020 | Tugbo | G05B 19/4155 |

OTHER PUBLICATIONS

Colin LeMahieu, "Nano: A Feeless Distributed Cryptocurrency Network", 2015. (Year: 2015).*

* cited by examiner

*Primary Examiner* — Kaveh Abrishamkar (57) ABSTRACT

Systems and methods to retrieve, encrypt, and transmit control area network (CAN), event data recorder (EDR), engine control unit (ECU) and onboard diagnostics (OBD) data from vehicles such as automobiles and airplanes etc. is disclosed. The invention having, but not limited to, several main parts: a first part being a microcontroller having onboard memory, a second part being a connector that interfaces with a vehicle's existing CAN, EDR, ECU and OBD data, a third part being onboard software that encrypts said data to a blockchain within a vehicle, and a fourth part being multiple, wireless transmitters that send blockchain information to a cloud network. An object of the invention is to leverage and decentralize valuable telematic, CAN, EDR, ECU and OBD vehicle data for an array of stakeholders including dealers, insurers and consumers in a secure manner through the latest cryptography software.

8 Claims, 3 Drawing Sheets

SYSTEM AND METHOD TO LEVERAGE EDR, ECU, CAN AND OBD DATA FROM VEHICLES BY MEANS OF BLOCKCHAIN TECHNOLOGY

FIELD OF INVENTION

The present invention generally relates to blockchain. More specifically, it relates to a system that leverages telematic, EDR, ECU, OBD and CAN vehicle data securely for stakeholders using blockchain cryptography software.

BACKGROUND

Blockchain was first invented by Satoshi Nakamoto in 2008. Nakamoto developed the software to serve as a public, distributed transaction ledger for the cryptocurrency known as 'bitcoin.' The invention of the blockchain software for bitcoin made it the first digital currency without the need of a trusted authority or central server such as a bank. Bitcoin relies on blockchain as a secure ledger. Each block in the software contains a cryptographic hash of the previous block, a timestamp, and transaction data. By design, a blockchain is resistant to modification of the data. For use as a distributed ledger, a blockchain is typically managed by a peer-to-peer network, collectively adhering to a protocol for inter-node communication and validating new blocks.

Once recorded, the data in any given block cannot be altered retroactively, without alteration of all subsequent blocks, which requires consensus of the network majority. Combined with smart contracts, such blockchains can be considered as a decentralized notary service that allows for transparency so that anyone with preset privileges can see what is inside a data element record constructed using cryptographic hash and time stamped. Smart contracts are dynamic, live contracts that once created cannot be changed but can perform certain actions when certain conditions are met—such as sharing records automatically with pre-approved parties using digital signatures. Blockchains themselves also continue to evolve. For example, in 2015, Nano (formerly Rai Blocks) was launched to solve issues such as slow transactions and high fees associated with time consuming bitcoin 'mining' (mass validation of transactions). Nano introduced a block structure called Block Lattice which skips mining, resulting in zero transaction fees. Block Lattice maintains one blockchain for each account controlled by private keys of the respective accounts.

Modern vehicles have a large number of controllers that are networked together and are used to send signals between the various components. The control area network (CAN) data is made up of numerous engine control units (ECUs) that allows small computers to interact with a vehicle component—for example, if a user pushes a button the CAN will tell an ECU to lock a door. Other ECUs can include mirror adjustments, window movements, engine control units (air fuel mixture, idle speed, valve timing, RPM limits, fuel metering, mileage); electric power steering control units (steering history); powertrain control modules (throttle position, vehicle speeds, traction control, transmission; transmission control unit (vehicle speeds); speed control units (cruise control); telematic control units (gps tracking); transmission control units; brake control modules (braking history); battery management systems (battery life) and airbags.

The role of the many ECUs within the CAN is to receive messages from dozens of sensors inside a vehicle and then perform adjustments dynamically to ensure proper vehicle performance. An object of the present invention is to allow vehicle consumers to interpret and utilize these ECU readings. There are numerous such types of data consumers can utilize, for example a customer looking to purchase a used vehicle could examine ECU readouts using the present invention and run into the following scenarios: a fuel system status indicator is observed—some vehicles don't have a fuel filter, rather they are built into the gas pump itself; if such a vehicle is running rough and the code is tripped, what could be a $30 filter repair code could mean an expensive $500 fuel pump replacement; if an engine coolant temperature code is observed—this signal could indicate a breach in the vehicle's coolant system, or worse it could indicate coolant leaking from an A.C. compressor bearing that could mean an expensive $250 repair, depending on where inside the engine bay it is located; a MAF airflow reading—this signal could indicate a car that has been modified. Some tinkerers replace the airflow intakes with larger aftermarket intakes in the hopes of directing more air to the engine for more power. However, this modification can cause excess fuel to be burned leading to extremely poor gas mileage; An O2 sensor code is detected—oxygen sensors covered in soot can also cause the vehicle's computer to dump excessive fuel to prevent stalling and lead to extremely poor gas mileage.

The onboard diagnostics (OBD) transmits error codes in a legible format—for example if an oxygen sensor is no longer sending a signal, the OBD will send a code to the dashboard informing a user of the problem. CAN became an international standard (ISO 11898) in 1993. Drivers can opt to allow data from such components to be monitored by insurance companies through a proprietary 'dongle' that records driving pattern data (known as telematics) and assigns a risk score to a driver for insurance premium adjustments. Vehicle manufacturers have recently begun incorporating blockchain cryptography into their vehicles. On Jul. 26, 2018, Toyota™ introduced an onboard data communication module (DCM) that links with CAN to provide subscribers with a 'mobility service platform.' United States Patent Pub. No. 2018/0091596 granted to Alvarez and Bowman teaches of a system that captures telematic data and stores it using blockchain cryptography; however, this system relies on conventional blockchain rather than lattice blockchain. Additionally, the system disclosed by Alvarez allows a user to control data transmissions based on pre-assigned permissions. Furthermore, the system disclosed by Alvarez and Bowman does not allow for direct intervention to counteract fraudulent alteration of odometers and other onboard systems.

EDRs may record a wide range of data elements, potentially including whether the brakes were applied, the speed at the time of impact, the steering angle, and whether or not seat belt were engaged.

Conventional blockchains tend to be relatively slow and are not compatible with microcontrollers and internet of things where transactions need to happen instantaneously. Lattice forms of block chains are much faster and are more compatible. Block lattice is a novel type of DAG (Directed Acyclic Graph) based architecture that was first introduced with the emergence of cryptocurrency. A block-lattice-type of architecture allows each individual transacting on a network to possess their own blockchain, which is managed by the individual's private keys. An important advantage of lattice block chain over conventional block chain (such as those observed in the prior art) is speed. Lattice blockchain designs offer greater computational efficiency which enables faster transaction times than conventional blockchain— making it more suitable for microcontrollers. Each user's blockchain tracks their account balance, rather than their transaction amounts (as normally seen in conventional blockchains). This method allows for less intensive storage requirements by means of database pruning. Each lattice blockchain is controlled by a user and also reflects information related to the individual's balance history and can only be updated by the owner.

Another important feature of the block lattice over conventional blockchains is that a user's blockchain can be updated asynchronously across the block lattice. With the block lattice architecture, because each user maintains their own blockchain that operates asynchronously to every other blockchain, time consuming consensus transactions (such as proof-of-work or proof-of-stake) are minimized or substantially reduced. Block lattice is much faster because the entire network no longer has to process every single transaction that is made or rely upon external systems to do so.

However, the present general inventive concept is not limited thereto. That is, in alternative exemplary embodiments, the time consuming consensus transactions may be eliminated using various techniques and methods according to the present general inventive concept.

SUMMARY OF THE INVENTION

The system herein disclosed and described provides a solution to the shortcomings in the prior art through the disclosure of a device to leverage CAN, ECU and OBD data by means of blockchain technology for transport vehicles.

An object of the invention is to retrieve all available data from within a vehicle and direct it into single, onboard receptacle. For example, CAN, ECU and OBD wiring harnesses are tapped and diverged into a single location as an independent, non-proprietary, element of a vehicle.

Another object of the invention is to provide 'onboard' blockchain encryption of the aforementioned data collected. Conventional vehicle systems allow an assortment of devices to download and manipulate data downstream of the vehicle. The current disclosure encrypts data on the blockchain (also referred to as a 'wallet') upstream before being downloaded from a vehicle at a later time.

Another object of the invention is to provide a historical archive of all vehicle data on the vehicle itself. As data is retrieved and encrypted, it is stored on a modern memory drive (such as a flash or solid state drives). While some EDR data is stored on antiquated, electrically erasable programmable read-only memory (EEPROM), a majority of CAN, ECU and OBD is written out from sensors but is not being captured.

Another object of the invention is to provide a means for verifying crucial vehicle output readings. For example, odometer tampering has long been known as way to falsely represent the mileage of a vehicle in order to fraudulently enhance its monetary value. However, the method of the current invention allows the odometer to be verified against mileage data in the tamper-proof block chain preventing such fraud from occurring.

An object of the present invention is to allow all stakeholders involved with a vehicle to access, monitor, share and analyze consistent, up-to-date vehicle CAN, EDR, ECU and OBD information in real-time, remotely—regardless of where a vehicle is in its life cycle. Although information and/or data may be constantly added and a redundant duplicate thereof is stored (maintained) electronically within the vehicle itself, previously generated information and/or data may not be altered or deleted. The distributed ledger containing the unalterable information and/or data is held at one or more central nodes that verify accuracy and control distribution of that information and/or data or value-added derivations thereof to authorized users, customers or governmental entities. The owner or operator of the vehicle has no permission to control the generation, or the alteration, of the data retrieved from said vehicle.

The present invention can also be applied to other forms of transportation networks such as those found in the aircraft industry. The aircraft industry has its own unique form of networks with its own set of acronyms such as EEC (electronic engine controllers), PMC (power management controllers), and FADEC (full authority digital engine controls). The present general invention provides consensus and validation of a secure, distributed ledger (considered a digital certificate on the vehicle) is visible to all those who have permission. Individual vehicle security integrity and validity is ensured via the blockchain files stored onboard a vehicle and is accessible on a cloud-based network online.

Another object of the present invention is to make vehicle CAN, EDR, ECU and OBD data available to pre-authorized stakeholders. For example, a manufacturer is authorized to create a 'genesis' block (first block in a blockchain) and inputs only new vehicle identification number (VIN) and specs (such as make and model number etc.) into the block based on their pre-authorized permissions on the smart contract within the blockchain. The blockchain is then loaded into the system (a hard-wired, standalone box within a vehicle) according to the present invention's memory within the vehicle. Manufacturers can also view, analyze and make improvements to vehicle designs based upon CAN, ECU and OBDs outputs gathered by the invention. However, the present general inventive concept is not limited thereto.

Another object of the present invention is to make vehicle CAN, EDR, ECU and OBD data available to pre-authorized regulators remotely. The onboard system has a dedicated, wireless transmitter that routinely sends said data (such as Wi-Fi, radio, XM radio, and satellite signals etc.) to a centralized, cloud server network where it can be accessed. For example, once a new foreign vehicle arrives in the United States, federal regulators can simply look up the vehicle on a computer and check to see that proper emissions, airbags, steering placement etc. are in order. Other local state-level agencies, such as the department of motor vehicles, can also have pre-authorized access to a vehicle's compliance status after a car is purchased and add/verify registration, and ownership by viewing a digital title in the blockchain online.

Another object of the invention is to ensure the aforementioned transmission signal accuracy by comparing the multiple signals transmitted. For example, when the invention transmits vehicle CAN, EDR, ECU and OBD data by radio waves, XM radio waves, Blue Tooth and cellular and satellite networks, algorithms on the receiving end on the cloud network server compare the data in each transmission to ensure they are similar before accepting the data as sound and valid.

Another object of the present invention is to make vehicle CAN, EDR, ECU and OBD data available to pre-authorized insurance agents. Such agents can connect to the cloud network and validate claims, calculate a payout, provide coverage based on real usage patterns, understand risk trends, and note event alerts (such as a crash) for accident component reporting. Assessing such data is also useful to expedite the insurance adjuster's role when verifying replacement parts after an accident. In fact, during an assessment the adjustor can use a mobile device such as a tablet and interact with the vehicle's systems to verify and ensure a proper damage assessment is conducted.

Another object of the present invention is to make vehicle CAN, EDR, ECU and OBD data available to pre-authorized vehicle dealers. By viewing the secured distributed ledger, dealers can determine when routine service is needed after reviewing miles traveled. If an OBD expresses a particular code, they can send a text message or SMS to the owner informing them to make an appointment to bring a vehicle in for service. Dealers can also respond to manufacturer's inputs to the chain for issues such as recalls and instantly notify a car owner. Making vehicle controller data transparent to all stakeholders has other benefits—particularly with regards to odometer fraud. For example, if a desperate dealer or owner tampers with an odometer's mileage reading in an effort to enhance its worth, the action will be recorded within the blockchain and the smart contract and will then send an alert notifying stakeholders that such tampering has occurred. Dealers can also benefit from the system according to the present invention when acquiring a used vehicle from a potential customer seeking a trade-in. They can examine a vehicle's complete history including engine run hours, idle hours, RPM ranges, accident records, maintenance records, as well as a host of other parameters to come up with an exact trade-in value to better serve their customers.

Another object of the present invention is to make vehicle CAN, EDR, ECU and OBD data available to pre-authorized vehicle owners. By empowering owners with such data, users can learn how to maintain their vehicle better. For example, an owner can check fluid levels in their vehicle in real-time using the online cloud network. Any levels that are low can be addressed quickly, potentially saving the owner costly repairs that may have occurred if gone unnoticed. They can also have the system according to the present invention remind them of routine maintenance issues when the secure distributed ledger is preset to interact with the cloud network automatically. The smart contract portion of the invention has the ability to enhance efficiencies for all stakeholders in a dramatic fashion. Because the smart contract has the ability to monitor vehicle and perform tasks in real time, it has the ability to streamline many transactions. For example, if the invention detects a faulty cam position sensor, the smart contract can automatically send a wireless signal to the cloud network, notify a participating repair shop of the issue and request a quote to replace the sensor. The repair quote can then be transmitted to the cloud network and the owner can receive the quote immediately via SMS, text message or email. These intermediary actions performed through the smart contract have the ability to save stakeholders time and effort.

Another object of the present invention is to provide a method and/or system that overrides an attempted altering of any vehicle data, including odometer data, to eliminate or reduce the occurrence of fraud, particularly with regards to odometer fraud. For instance, the method and/or system according to the present invention is configured to reset the odometer, if and when the system determines that vehicle data has been falsified. In exemplary embodiments, this may be an automatic or manually initiated override process which may accurately compensate for any mileage between last record and override.

Certain of the foregoing and related aspects are readily attained according to the present general inventive concept by also providing a method for securing data obtained from a vehicle, the method includes the steps of receiving data signals from a vehicle, generating a unique identifier corresponding to the vehicle, combining the generated unique identifier with received data signals, encrypting the unique identifier and the received data signals using a blockchain protocol, storing blockchain-encrypted data within a vehicle, confirming vehicle mileage, transmitting the encrypted data to an external device using a communication module, and comparing encrypted data transmissions.

The data signals may include one of telematic data, CAN data, EDR data, ECU data, and OBD data.

The unique identifier may be binary data.

The encrypting may utilize blockchain cryptography including Block Lattice.

The encrypting blockchain may include at least one hash algorithm of Blake 2s, Blake2b, Blake2x, SHA-2, SHA-3, Keccak, MD-5, zk-SNARKs, bcrypt, and scrypt, and Argon2.

The external device may include one of a cloud network server, a server, a wireless networked server, and a wired networked server.

The communication device may include one of a radio transmitter, a satellite transmitter, a wireless electronic device, a Wi-Fi device, and a Bluetooth device.

The transmitting of encrypted data may occur simultaneously over radio transmitter, a satellite transmitter, a wireless electronic device, a Wi-Fi device, and a Bluetooth device.

The software comparing of the encrypted data may from multiple transmission sources.

It is briefly noted that upon a reading this disclosure, those skilled in the art will recognize various means for carrying out these intended features of the invention. As such it is to be understood that other methods, applications and systems adapted to the task may be configured to carry out these features and are therefore considered to be within the scope and intent of the present invention and are anticipated. With respect to the above description, before explaining at least one preferred embodiment of the herein disclosed invention in detail, it is to be understood that the invention is not limited in its application to the details of construction and to the arrangement of the components in the following description or illustrated in the drawings. The invention herein described is capable of other embodiments and of being practiced and carried out in various ways which will be obvious to those skilled in the art. Also, it is to be understood that the phraseology and terminology employed herein are for the purpose of description and should not be regarded as limiting.

As such, those skilled in the art will appreciate that the conception upon which this disclosure is based may readily be utilized as a basis for designing of other structures, methods and systems for carrying out the several purposes of the present disclosed device. It is important, therefore, that the claims be regarded as including such equivalent construction and methodology insofar as they do not depart from the spirit and scope of the present invention. As used in the claims to describe the various inventive aspects and embodiments, "comprising" means including, but not limited to, whatever follows the word "comprising". Thus, use of the term "comprising" indicates that the listed elements are required or mandatory, but that other elements are optional and may or may not be present. By "consisting of" is meant including, and limited to, whatever follows the phrase "consisting of". Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they affect the activity or action of the listed elements.

The objects features, and advantages of the present invention, as well as the advantages thereof over existing prior art, which will become apparent from the description to follow, are accomplished by the improvements described in this specification and hereinafter described in the following detailed description which fully discloses the invention, but should not be considered as placing limitations thereon.

DESCRIPTION OF THE FIGURES

The accompanying drawings, which are incorporated herein and form a part of the specification, illustrate some, but not the only or exclusive, examples of embodiments and/or features.

Other aspects of the present invention shall be more readily understood when considered in conjunction with the accompanying drawings, and the following detailed description, neither of which should be considered limiting.

DESCRIPTION OF INVENTION

In this description, the directional prepositions of up, upwardly, down, downwardly, front, back, top, upper, bottom, lower, left, right and other such terms refer to the device as it is oriented and appears in the drawings and are used for convenience only; they are not intended to be limiting or to imply that the device has to be used or positioned in any particular orientation.

Figure 1:
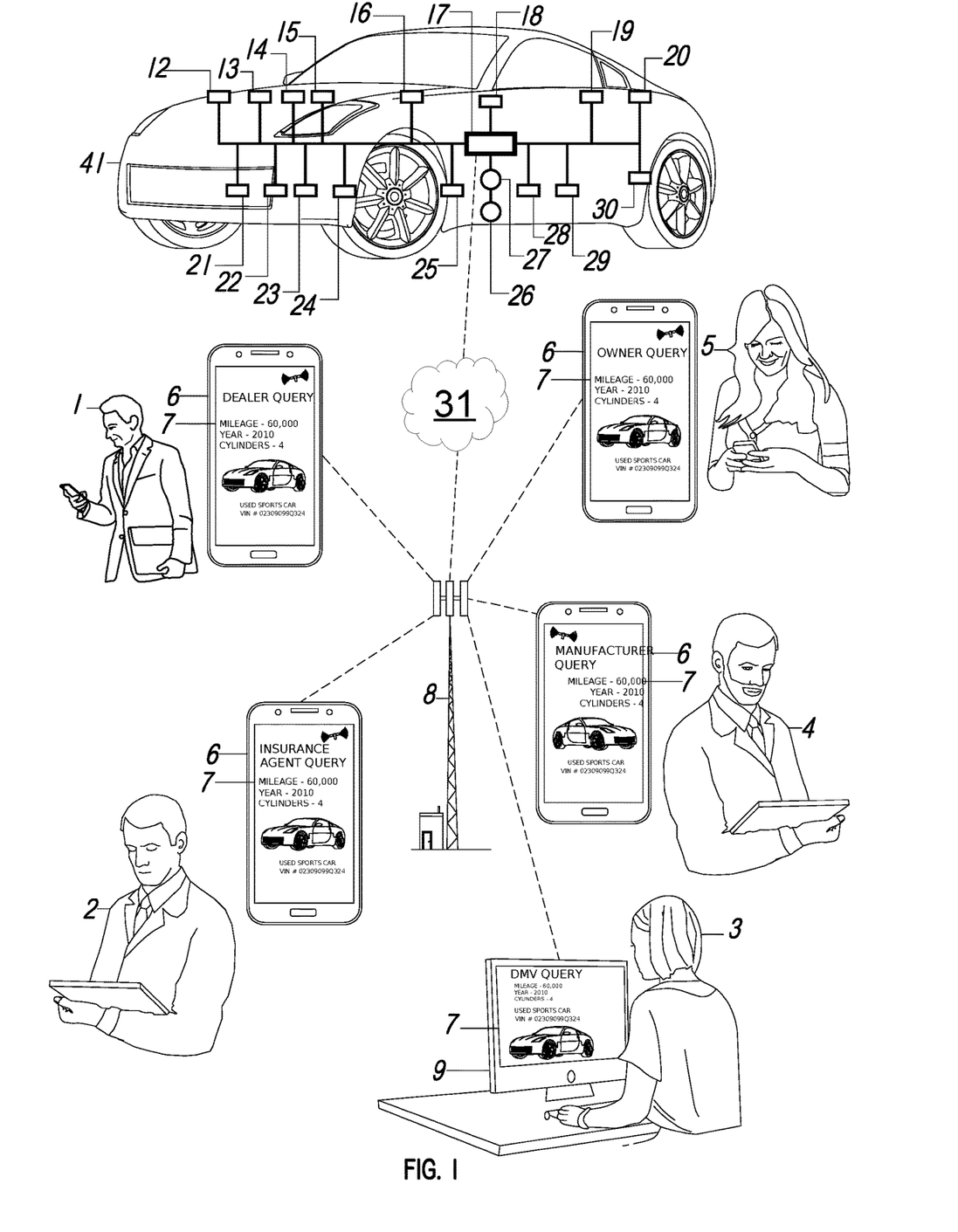
FIG. 1 shows an illustrative view of systems and components used in an operational environment for a system for securing data obtained from a vehicle according to an example of the present general inventive concept.

FIG. 1 shows an illustrative view of systems and components used in an operational environment for a system 100 for securing data obtained from a vehicle 41 according to an example of the present general inventive concept. The system 100 according to the present general inventive concept includes a hardware device having an integrated CPU, microcontroller, a network module to communicate to a network 31, and a memory used to store programs. In alternative embodiments, the system 100 may be implemented an integrated device embedded in a vehicle console, radio, or satellite radio configured to communicate with a satellite. However, the present general inventive concept is not limited thereto. That is, in further embodiments, the system 100 may be implemented as a separate and detachable device having a wired access connection to the OBD-2 port installed within a vehicle and configured to communicate with a satellite using a communication module.

The apparatus, device, or system according to the present invention being comprised of microcontroller 17 being fixedly connected to a vehicle's existing sensing systems such as but not limited to CAN 27 and OBD 26 by means of, but not limited to OBD adaptor terminals, twisted pair and pin connections and the like. However, the present general inventive concept is not limited thereto. Other embodiments of the invention being connected to other sensing systems such including but not limited to EDR and ECU etc. Vehicles may include but are not limited to: vans, sedans, jeeps etc. and may even include other forms of transportation such as airplanes etc. The figure illustrating the multitude of conventional ECU sensors usually found in vehicles, such as but not limited to: coolant 21, engine speed 22, throttle position 23, crank position 24, cam position 25, knock sensor 26, manifold pressure 27, mass air flow 28, oxygen sensor 28, fuel pressure 29, vehicle speed 30, emissions 12, injection circuit 13, ignition 14, idle speed 15, fuel mixture 16, evaporators 18, catalytic converter 19, oxygen sensor 20 and the like. Said microcontroller having an internal memory buffer storing digital certificate therein and reading all CAN, ECU and OBD etc. data signals at a constant rate as determined by the various stakeholders as per the smart contract and being stored on internal memory therein. However, the present general inventive concept is not limited thereto.

Microcontroller 17 also having a transmitter and receiver to send and receive signals via modes such as, but not limited to: ethernet, Bluetooth™, WIFI, satellite, AM/FM radio waves, XM radio waves, cell phone frequencies and the like. FIG. 1 illustrates the system 100 according to the present invention sending a signal to the cloud 31 and then to the cell tower 8 and being received by mobile devices 7 operated by stakeholders such as, but not limited to: car dealer 1, insurance agent 2, department of motor vehicles clerk 3, manufacturer 4 and vehicle owner 5. Each stakeholder having the software 6 which allows them to have agreed upon blockchain permissions and access levels to perform queries and addendums to the blockchain. The software incorporated by the present invention being written from code that may include, but not be limited to: Java™, C++™, Visual Basic™, Fortran™, Basic™, Solidity, Python, Vyper, and the like. The software may also be compatible with a plurality of operating systems such as, but not limited to: Windows™ Apple™, Linux™ and Android™ and compatible with a multitude of hardware platforms such as, but not limited to: personal desktops, laptops, tablets, smartphones and the like.

Figure 2:
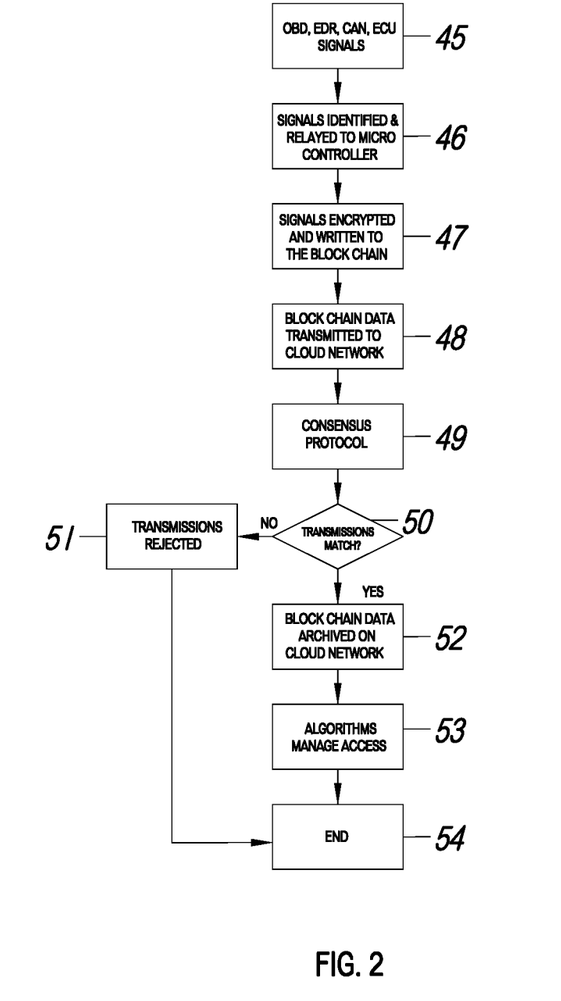
FIG. 2 shows a flow chart of a method performed using the system for securing data obtained from a vehicle illustrated in FIG. 1, according to an example embodiment of the present general inventive concept.

FIG. 2 shows a flow chart of a method performed using the system 100 for securing data obtained from a vehicle 41 illustrated in FIG. 1, according to an example embodiment of the present general inventive concept.

In steps 45 and 46, existing ECU, EDR, CAN and OBD elements of a vehicle 41 are connected or allowed to communicate with the microcontroller 17 according to an example method of using the system 100. Data from the aforementioned elements being gathered continuously (or on a preset time interval), and stored temporarily onboard local memory where they are identified (step 46) and encrypted as a new block and written to the existing genesis block chain (step 47). Said genesis block being created and written to the microcontroller's memory by an authorized vehicle manufacturer. Said encryption in step 47 may include converting binary signals into pre-determined text strings governed by an algorithm residing in the microcontroller's firmware to allow it to be compatible with the block chain. After the data has been written to the microcontroller and stored in its memory (such as but not limited solid state drives, flash drives, buffer drives and the like); they are incorporated on a new block. Said blockchain being a block lattice having or utilizing cryptographic hash functions and/or key derivation functions including, but not limited to Blake2s, Blake2b, Blake2x, SHA-2, SHA-3, MD-5, Argon2, Keccak, bcrypt, scrypt, PDKDF2, or zk-SNARK. A UDP protocol being used instead of TCL due to mobility of the vehicle and possible non-connectivity or intermittent connectivity issues. However, the present invention is not limited thereto. That is, in alternative embodiments, various types of cryptographic hash functions and/or hashing algorithms may be used as desired.

Once said block chain is updated it is transmitted to the proprietary cloud network 31 by means of a multitude of transmission methods simultaneously (step 48). These methods may include but are not limited to radio waves, cellular networks, satellite signals, Bluetooth signals, WiFi signals and the like. Upon being received by the cloud network, algorithms performing a 'consensus protocol' (step 49) whereby the multiple signals are compared for consistency as an extra security measure. When a majority of the signals are matched with the transmitted block chain data being archived (step 52) by algorithms according to preconfigured directories—such as but not limited to vehicle identification numbers (VINs); owners and the like. After being archived, algorithms on the cloud network managing and verifying the authorized stakeholders and allowing them to activate the distributed ledger to query or make addendums to the blockchain and receive comprehensive vehicle summary reports after the results are transmitted and routed through a cloud network and the process ending (step 54). Signal transmissions that do not match according to the consensus protocol are rejected (step 51) and the process is ended (step 54).

Figure 3:
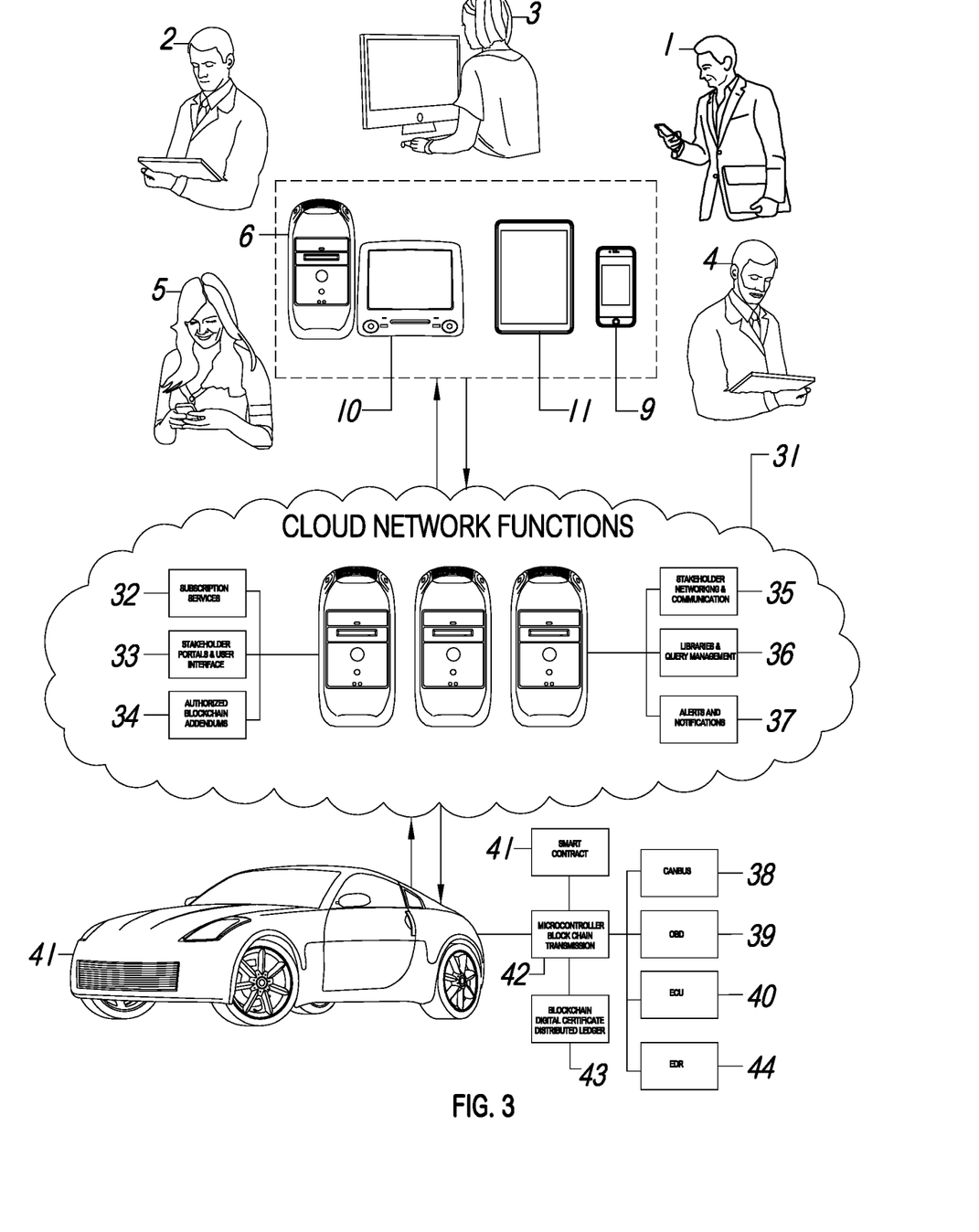
FIG. 3 shows an illustrative view of the system for securing data obtained from a vehicle coupled to a cloud network, according to an example embodiment of the present general inventive concept.

FIG. 3 shows an illustrative view of the system for securing data obtained from a vehicle coupled to a cloud network, according to an example embodiment of the present general inventive concept.

The figure showing inputs that include but are not limited to EDR 44, CANBUS 38, OBD 39, EDR 44 and ECU 40 signals being transferred into microcontroller 42. Said signals being organized and governed by a predetermined and agreed upon smart contract 41 and a secure blockchain digital certificate distributed ledger 43. The figure showing the microcontroller allowing pre-authorized transmissions of selective data from said blockchain 43 to a cloud network 31 at predetermined, consensus-driven, time intervals and being comprised of a multitude of simultaneous transfer frequencies including but not limited to radio, Bluetooth, WiFi, cellular, satellite and the like. Cloud network 31 having a plurality of servers therein and supporting the activation of software algorithms such as, but not limited to: subscription services 32, stakeholder login portals 33, authorized blockchain tasks 34, stakeholder consensus network sharing and communication means 35, vehicle blockchain libraries and query management functions 36 and alerts and notifications for stakeholders (both manual and automatic) 37. FIG. 3 also showing stakeholder computing devices that interact with said cloud network 31 such as, but not limited to: personal computers 6, interactive cable television 10, tablets 11, and mobile communication devices 9 and the like. Other embodiments of the present invention having a plurality of data capturing features such as, but not limited to fingerprint authentication, bar code recognition, QR code recognition, and facial recognition (also referred to as biometrics) as well as global positioning system (GPS) tracking. However, the present general inventive concept is not limited thereto.

In exemplary embodiments, an operation of the system 100 according to the present general inventive concept includes a user or designated installer executing a software program stored within the memory to initially register a new device to the network 31 via the network module.

In an example embodiment, the user or installer may capture an image of the vehicle identification number (VIN) of the vehicle using a camera, smartphone, or the like. This image may be uploaded to a network node of the network 31 which is configured to scan the image for the presence of a VIN in the image, verify that the scanned VIN has not been previously used within the network 31, register the VIN within the network 31, and generate a unidirectional cryptographic hash for the image. However, the present general inventive concept is not limited thereto. In alternative embodiments, the generated hash will be used as a digital identity record and/or component of the user access control in future transactions involving the vehicle associated with the scanned VIN. In other example embodiments, various other cryptographic methods may be used on the scanned image.

In alternative embodiments, additional objects may be placed adjacent to the vehicle VIN before capturing the image in order to increase the uniqueness of the image. Subsequently, the user will be instructed to delete the image from the camera or smartphone for security purposes. In addition, the system 100 may be configured to generate a digital identity template using the communication module via wireless internet, radio, wired connection or other proprietary hardware. The digital identity template may request a text input of a serial number associated to the hardware device of the system 100, the VIN of the vehicle, and the valid hash previously generated. Registration of a new device (system 100) associated with a particular vehicle is complete when a unique serial number is coupled with a text input of a new VIN and a valid hash generated from a picture of the VIN associated with the vehicle. As a result, the registered device (system 100) may then be allowed to receive and send data to the network 31 via the network nodes or modules.

In other embodiments, the system 100 may be configured to store the digital identity record corresponding to a particular vehicle within the system 100 blockchain. To do so, the system 100 may allow an authorized user to generate digital identity templates of different types based on the entity. The digital identity template may include mandatory data fields and supplemental data fields. The system 100 may store the digital identity templates within the system 100 blockchain and/or in the database or ledger 43. When the system 100 receives a request to generate a digital identity record for an entity, the system 100 may retrieve a digital identity template, either from the system 100 blockchain or from the database 43, based on the type of the entity. The system 100 may generate a digital identity record based upon the respective digital identity template. In alternative embodiments, the system 100 may prompt the entity or user to enter the information required for data fields in the generated digital identity record. In the present embodiment, one or more data fields of the digital identity record may have an independent status, and the system 100 or external server may update the status of the digital identity record.

In the present embodiment, the system 100 includes a software program stored within the memory, which, when executed by the CPU assigns each individual device a unique cryptographic digital signature (i.e., identifying string) that will be incorporated in all transmissions to the network 31. This identifying string itself will attempt to reduce or eliminate the availability of identifiable information on chain as much as possible, excluding information including vehicle VIN, make, model, or personally identifiable information of a user or installer. The system 100 may then generate a genesis block to begin the process of recording vehicle information on a chain. Each vehicle or account maintains a separate blockchain in accordance with the principles of block lattice architecture. For instance, the principles of RAIBlocks, Nano, or the like. Only the hardware device of the system 100 installed or embedded within each vehicle can update that vehicle's chain and transactions occur independently and asynchronously from each vehicle.

Upon registration, the hardware device of the system 100 is configured to begin monitoring vehicle telemetry information directly from the OBD-2, CANBus, ECU's or other onboard diagnostic systems and/or components thereof. When (or if) the received telemetry information meets a predefined criterion set within the hardware device firmware, the system 100 is configured to automatically send the information to the network 31 using the communication module. The communication module may be an externally connected device or embedded telecommunications device within the system 100. However, the present general inventive concept is not limited thereto. That is, in alternative embodiments, the system 100 may send the vehicle's telemetry information to the network 31 using a wireless internet connection, radio, cellular, satellite, or the like. The predefined criteria may include scheduled intervals of time of vehicle usage, vehicle mileage, diagnostic codes or loss of contact with OBD-2 or ECU.

For instance, when the system 100 detects telemetry data or various other relevant data that meets the predetermined criteria to be sent to the network 31, a stored program is then executed to perform the operation of generating an additional block to transmit to the blockchain. All transmitted blocks may include basic information including unique identifier, vehicle identification number (VIN), current vehicle mileage, date and time, hash of previous block and proof-of-work nonce, as well as the new telemetry data and various other relevant data. The other relevant data may include vehicle diagnostic codes, installation of new hardware, changes in status of the vehicle, or other data obtained from vehicle sensors. For instance, the other relevant data may include information that the OBD-2 has been tampered with or disconnected from the system 100, data from a sensor that detects when the vehicle has been placed on a lift, and/or data from a sensor that detects when the system 100 has been tampered with. However, the present general inventive concept is not limited thereto. Each instance of new telemetry data and/or other relevant data will require a unique block and transaction.

Transactions are validated by a consensus protocol that may include proof-of-stake and/or proof-of-work. However, the present general inventive concept is not limited thereto. In an embodiment, the system 100 may function as polling nodes.

In an alternative embodiment, the consensus network nodes are separate proprietary devices. In the present embodiment, in operation, when the system 100 does not receive confirmation that the chain has been pushed to the network 31, the system 100 will continue to push that information (i.e., new telemetry data or various other relevant data) to the network 31 at designated intervals, until confirmation is received. In addition, various other automatic programs may be executed, including smart contracts, in response to on-chain information.

In the present embodiment, the system 100 generates block lattice 102 that forms an indelible distributed ledger 104 that records all relevant information about each individual vehicle and, in total, the comprehensive record of all vehicles with the system 100 installed thereon. In alternative embodiments, the system 100 may include additional layers of security to the network 31 and/or via software on the hardware device of the system 100.

In exemplary embodiments, when an unauthorized user attempts to access information from the vehicle, the unauthorized user will be required to purchase valid credentials to access information associated with the particular vehicle. A user with valid credentials may search the network 31 for information about a particular vehicle by in putting the vehicle's vehicle identification number (VIN) to determine whether that vehicle has been registered within the system 100. If the VIN exists within the network 31, the system 100 is configured to retrieve information corresponding to the VIN from the network 31. The network 31 may then access and decrypt the machine-readable information associated with the particular VIN and generate a human-readable derivative of the full record of the vehicle since the installation of the hardware device. The user's human-readable derivative record will then be transmitted by an analytically organized and user-friendly interface.

In an exemplary embodiment, the user's human-readable derivative record may further include additional information obtained separately and off-chain. In alternative embodiments, the user's human-readable derivative record may further include additional "pushes" that were not approved by the consensus protocol. In yet further embodiments, the user's human-readable derivative record may further include analysis of vehicle price, condition, comparisons to other similar vehicle records within the network 31 or other derived scores or measurements from on-chain or off-chain information.

In exemplary embodiments, the system 100 may copy and/or store the cryptographic hash of any derived record or additional records in association with a data field, such as a hardware device or vehicle VIN. This saving protocol allows for immutability of a document file that is not saved within the blockchain but on a non-blockchain data repository, such as an external database in communication with the network 31.

In further embodiments, the system 100 may further implement a block cementing process to ensure the resilience of data stored on chain corresponding to telemetry data or various other relevant data of a vehicle.

In further embodiments, the system 100 may further routinely monitor all information stored on chain in order to derive data, conduct analytics, maintain information secrecy, and the like.

It is additionally noted and anticipated that although the device is shown in its most simple form, various components and aspects of the device may be differently shaped or slightly modified when forming the invention herein. As such those skilled in the art will appreciate the descriptions and depictions set forth in this disclosure or merely meant to portray examples of preferred modes within the overall scope and intent of the invention and are not to be considered limiting in any manner. While all of the fundamental characteristics and features of the invention have been shown and described herein, with reference to particular embodiments thereof, a latitude of modification, various changes and substitutions are intended in the foregoing disclosure and it will be apparent that in some instances, some features of the invention may be employed without a corresponding use of other features without departing from the scope of the invention as set forth. It should also be understood that various substitutions, modifications, and variations may be made by those skilled in the art without departing from the spirit or scope of the invention.

What is claimed is:

1. A method for securing data obtained from a vehicle, the method comprising the steps of:
   a) generating a predefined criterion set of instructions to define signals, events, or conditions that will cause data to be monitored, detected and/or transmitted from a vehicle;
   b) generating a unique identifier corresponding to the vehicle;
   c) monitoring of onboard diagnostic systems;
   d) receiving telematics data signals from an onboard diagnostic system of a vehicle, or at least one subsystem, data sensor or component thereof;
   e) retrieving vehicle mileage and other data or information according to the predefined criterion set of instructions;
   f) combining and encrypted the generated unique identifier with the retrieved data and the received telematics data signals;
   g) storing encrypted data and/or a cryptographic hash thereof in a local machine readable storage medium located onboard the vehicle;
   h) automatically transmitting the encrypted data to a cloud network server using a Communication Module according to the predefined criterion set of instructions for the entry in a blockchain distributed ledger;
   i) validating the encrypted data transmissions;
   j) incorporating a valid transmission into the blockchain distributed ledger;
   k) creating, operating or executing a smart contract following the transmission of the telematics data to the blockchain distributed ledger;
   wherein the operation of the smart contract may cause the communication device to:
      decrypt the encrypted telematics data and related information corresponding to the vehicle from the blockchain distributed ledger;
      generate a human-readable or machine-readable derivative of the telematics data and related information, in whole or in part; and
      transmit the derivative to a party designed in the smart contract;
   wherein the operation of the smart contract may additionally cause a communication device and/or machine-readable storage medium to cause an automatic override process to modify the state of a component on a vehicle to correspond with information stored on the blockchain distributed ledger.

2. The method of claim 1, wherein the data signals include one or more of telematics data, CAN data, EDR data, ECU data, avionic data, and OBD data.

3. The method of claim 1, wherein the unique identifier and/or data is encrypted by means of at least one cryptographic hash algorithm or function at any time.

4. The method of claim 1, wherein the cloud network server includes one of a server, a wireless networked server, a wired networked server or an external device.

5. The method of claim 1, wherein the communication device includes one or more of a radio transmitter, a satellite transmitter, a wireless electronic device, a Wi-Fi device, and a Bluetooth device.

6. An electronic device comprising:
   a microcontroller;
   a processor; and
   a memory to store a software program, wherein the software program, when executed by the processor, causes the processor to perform the method of claim 1.

7. The electronic device of claim 6, wherein the software program is configured to additionally function as a blockchain wallet.

8. The electronic device of claim 6, wherein the software program may participate in a consensus protocol to perform validation in the method of claim 1.

* * * * *